United States Patent
Romero et al.

(10) Patent No.: US 12,033,393 B2
(45) Date of Patent: Jul. 9, 2024

(54) 3D OBJECT DETECTION METHOD USING SYNERGY OF HETEROGENEOUS SENSORS FOR AUTONOMOUS DRIVING

(71) Applicant: GM Global Technology Operations LLC, Detroit, MI (US)

(72) Inventors: Rodolfo Valiente Romero, Orlando, FL (US); Hyukseong Kwon, Thousand Oaks, CA (US); Rajan Bhattacharyya, Sherman Oaks, CA (US); Michael J. Daily, Thousand Oaks, CA (US); Gavin D. Holland, Oak Park, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 466 days.

(21) Appl. No.: 17/487,835

(22) Filed: Sep. 28, 2021

(65) Prior Publication Data
US 2023/0109712 A1 Apr. 13, 2023

(51) Int. Cl.
*G06V 20/58* (2022.01)
*G01S 17/89* (2020.01)
*G06V 10/82* (2022.01)
*G06V 20/64* (2022.01)

(52) U.S. Cl.
CPC .............. *G06V 20/58* (2022.01); *G01S 17/89* (2013.01); *G06V 10/82* (2022.01); *G06V 20/64* (2022.01)

(58) Field of Classification Search
CPC ........ G06V 10/82; G06V 20/64; G06V 20/58; G01S 17/931; G01S 17/89
See application file for complete search history.

(56) References Cited

PUBLICATIONS

Chen, Xiaozhi, et al. "Multi-view 3d object detection network for autonomous driving." Proceedings of the IEEE conference on Computer Vision and Pattern Recognition. 2017. (Year: 2017).*

Arnold, Eduardo, et al. "Cooperative perception for 3D object detection in driving scenarios using infrastructure sensors." IEEE Transactions on Intelligent Transportation Systems 23.3 (2020): 1852-1864. (Year: 2020).*

Huang, Tengteng, et al. "Epnet: Enhancing point features with image semantics for 3d object detection." Computer Vision-ECCV 2020: 16th European Conference, Glasgow, UK, Aug. 23-28, 2020, Proceedings, Part XV 16. Springer International Publishing, 2020. (Year: 2020).*

(Continued)

*Primary Examiner* — Vu Le
*Assistant Examiner* — Tracy Mangialaschi
(74) *Attorney, Agent, or Firm* — Vivacqua Crane, PLLC

(57) ABSTRACT

A method for performing object detection during autonomous driving includes: performing 3D object detection in a 3D object detection segment; uploading an output of multiple sensors in communication with the 3D object detection segment to multiple point clouds; transferring point cloud data from the multiple point clouds to a Region Proposal Network (RPN); independently performing 2D object detection in a 2D object detector in parallel with the 3D object detection in the 3D object detection segment; and taking a given input image and simultaneously learning box coordinates and class label probabilities in a 2D object detection network operating to treat object detection as a regression problem.

14 Claims, 2 Drawing Sheets

(56) References Cited

PUBLICATIONS

Charles, R. Qi, et al. "Frustum pointnets for 3d object detection from rgb-d data." Proceedings of the IEEE conference on computer vision and pattern recognition. 2018. (Year: 2018).*

Alex H. Lang, et al., PointPillars: Fast Encoders for Object Detection from Point Clouds, Proceedings of the IEEE/CVF Conference on Computer Vision and Pattern Recognition, Jun. 2019, pp. 12697-12705.

Charles R. Qi, et al., Frustum PointNets for 3D Object Detection from RGB-D Data, Proceedings of the IEEE Conference on Computer Vision and Pattern Recognition, Jun. 2018, pp. 918-927.

Charles R. Qi, et al., PointNet: Deep Learning on Point Sets for 3D Classification and Segmentation, Proceedings of the IEEE Conference on Computer Vision and Pattern Recognition, Jul. 2017, pp. 652-660.

Charles R. Qi, et al., Volumetric and Multi-View CNNs for Object Classification on 3D Data, Proceedings of the IEEE Conference on Computer Vision and Pattern Recognition, Jun. 2016, pp. 5648-5656.

Daniel Maturana and Sebastian Scherer, VoxNet: A 3D Convolutional Neural Network for Real-Time Object Recognition, 2015 IEEE/RSJ International Conference on Intelligent Robots and Systems (IROS), Sep. 2015, pp. 922-928.

Hang Su et al., Multi-view Convolutional Neural Networks for 3D Shape Recognition, Proceedings of the IEEE International Conference on Computer Vision, Dec. 2015, pp. 945-953.

Shaoshuai Shi, et al., From Points to Parts: 3D Object Detection from Point Cloud with Part-aware and Part-aggregation Network, IEEE Transactions on Pattern Analysis and Machine Intelligence, Mar. 16, 2020, pp. 1-16, arXiv.

Shaoshuai Shi, et al., PointRCNN: 3D Object Proposal Generation and Detection from Point Cloud, Proceedings of the IEEE/CVF Conference on Computer Vision and Pattern Recognition, Jun. 2019, pp. 770-779.

Yilun Chen, et al., Fast Point R-CNN, Proceedings of the IEEE/CVF International Conference on Computer Vision, Oct. 2019, pp. 9775-9784.

* cited by examiner

3D OBJECT DETECTION METHOD USING SYNERGY OF HETEROGENEOUS SENSORS FOR AUTONOMOUS DRIVING

INTRODUCTION

The present disclosure relates to object detection during operation of autonomously operated vehicles.

One of the most critical components in autonomous driving is 3D object detection. Autonomously operated automobile vehicles need to accurately detect and localize other vehicles and pedestrians in 3D to drive safely. Recently, great progress has been made on 2D object detection. While 2D detection algorithms are mature, the detection of 3D objects still faces great challenges. In present autonomous driving, 3D object detection is mainly based on camera or 3D sensors. The most commonly used 3D sensors are Laser Imaging Detecting And Ranging (LIDAR) sensors, which generate 3D point clouds to capture 3D structures of the scenes.

Image-based methods can use monocular or stereo images. Methods built solely upon 2D object detection impose extra geometric constraints to create 3D proposals. These methods can only generate coarse 3D detection results due to the lack of depth information and can be substantially affected by appearance variations. Other methods apply monocular or stereo-based depth estimation to obtain 3D coordinates of each pixel. These 3D coordinates are either entered as additional input channels into a 2D detection pipeline or used to extract hand-crafted features.

Existing autonomous driving approaches therefore principally rely on LIDAR sensors for accurate 3D object detection. While recently, pseudo-LiDAR has been introduced as a promising alternative, there is still a notable performance gap and the gap increases when testing in other datasets (different than KITTI) showing that pseudo-LIDAR is still not accurate in generalization.

Thus, while current autonomous vehicle driving approaches achieve their intended purpose, there is a need for a new and improved method for performing object detection during autonomous driving.

SUMMARY

According to several aspects, a method for performing object detection during autonomous driving includes: performing 3D object detection in a 3D object detection segment; uploading an output of multiple sensors in communication with the 3D object detection segment to multiple point clouds; transferring point cloud data from the multiple point clouds to a Region Proposal Network (RPN); independently performing 2D object detection in a 2D object detector in parallel with the 3D object detection in the 3D object detection segment; and taking a given input image and simultaneously learning box coordinates and class label probabilities in a 2D object detection network operating to treat object detection as a regression problem.

In another aspect of the present disclosure, the method further includes operating multiple Laser Imaging Detecting And Ranging (LIDAR) sensors to generate the output of the multiple sensors in the 3D object detection segment to further generate 3D point clouds to capture 3D structures in a set of vehicle visible scenes.

In another aspect of the present disclosure, the method further includes operating the RPN to assign data from the multiple point clouds in a 3D point cloud segmentation member to individual points in the point clouds and assigning a label representing a real-world entity.

In another aspect of the present disclosure, the method further includes transferring an output from the RPN to a Region-based Convolutional Neural Network (RCNN).

In another aspect of the present disclosure, the method further includes: applying a 3D box estimator to generate one or more bounding boxes (BB)s; and passing an output from the 3D box estimator for fusion with 2D object output from the 2D object detector to a box consistency and filtering unit.

In another aspect of the present disclosure, the method further includes enhancing 2D detection by combining one-stage 2D object detection and two-stage instance segmentation.

In another aspect of the present disclosure, the method further includes automatically segmenting and constructing pixel-wise masks for every object in an image in an instance segmentation network.

In another aspect of the present disclosure, the method further includes: generating regions of the image that potentially contain an object; ranking the regions based on a score which determines how likely it is that any one of the regions could potentially contain the object; and retaining a top "N" most confident scored regions.

In another aspect of the present disclosure, the method further includes: passing image output from a camera to an instance segmentation deep neural network (DNN) having an instance segmentation device wherein different instances of the object receive a different label; and moving an output from the instance segmentation device to an instance mask detector where a segmentation device output is a binary mask for the regions.

In another aspect of the present disclosure, the method further includes: transferring 2D data from a 2D object detection segment defining data of the images of the camera to a 2D object detector; transferring an output from the 2D object detector together with an output from the instance mask detector into a constraint device; and sending an output from the constraint device and the DNN to an enhanced 2D detector.

According to several aspects, a method for performing object detection during autonomous driving includes: receiving sensor data from multiple sensors and applying the sensor data to generate 3D point clouds to capture 3D structures; performing 3D object detection in a 3D object detector including identifying multiple 3D objects directly from the point clouds; conducting enhanced 2D object detection in parallel with the 3D object detection segment to identify 2D objects using an enhanced 2D object detector; performing a synergy of the 2D objects and the 3D objects in a 2D and 3D synergy segment; and producing a final 3D object detection for an aggregated perception.

In another aspect of the present disclosure, the method further includes entering data from the 3D objects into a 3D box estimator.

In another aspect of the present disclosure, the method further includes passing an output from the 3D box estimator and an output from the enhanced 2D detector to a box consistency and filtering unit to generate multiple bounding-boxes (BB)s.

In another aspect of the present disclosure, the method further includes filtering the multiple bounding-boxes (BB)s based on high overlap with high confidence 2D proposals after projection onto multiple images functioning as a filter reducing false positive objects incorrectly detected in the point clouds.

In another aspect of the present disclosure, the method further includes: generating regions of the multiple images; ranking the regions based on a score which determines how likely it is that any one of the regions could potentially contain one of the multiple 3D objects; and retaining a top "N" most confident scored regions; sending individual ones of the N most confident scored regions through three parallel branches of an instance segmentation network defining a label prediction, a BB prediction, and a mask prediction; and computing a binary mask for each of the N most confident scored regions, automatically segmenting and constructing pixel-wise masks for every object in the image; and removing redundant proposals using a confidence score and a non-maximum suppression (NMS) based IoU_t.

In another aspect of the present disclosure, the method further includes enhancing the 2D object detection by applying instance segmentation together with the 2D object detectors.

In another aspect of the present disclosure, the method further includes: fusing image data and sensor data; and retaining individual ones of the 2D objects and the 3D objects that are consistent in both the 3D object detection segment and the 2D object detection segment.

A system to perform object detection during autonomous driving includes a 3D object detection segment performing 3D object detection. Multiple sensors are in communication with the 3D object detection segment, the multiple sensors individually having an output uploaded to one of multiple point clouds. Point cloud data from the multiple point clouds transferred to a Region Proposal Network (RPN). A 2D object detector independently performs 2D object detection in parallel with the 3D object detection in the 3D object detection segment. A 2D object detection network operates to treat object detection as a regression problem taking a given input image and simultaneously taking learning box coordinates and class label probabilities.

In another aspect of the present disclosure, the multiple sensors individually define a Laser Imaging Detecting And Ranging (LIDAR) sensor operating to capture 3D structures in a set of vehicle visible scenes.

In another aspect of the present disclosure, a camera outputs an image. An instance segmentation deep neural network (DNN) has an instance segmentation device wherein different instances of the object receive a different label. An instance mask detector receives an output from the instance segmentation device where the output of the instance segmentation device defines a binary mask for regions of the vehicle visible scenes.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
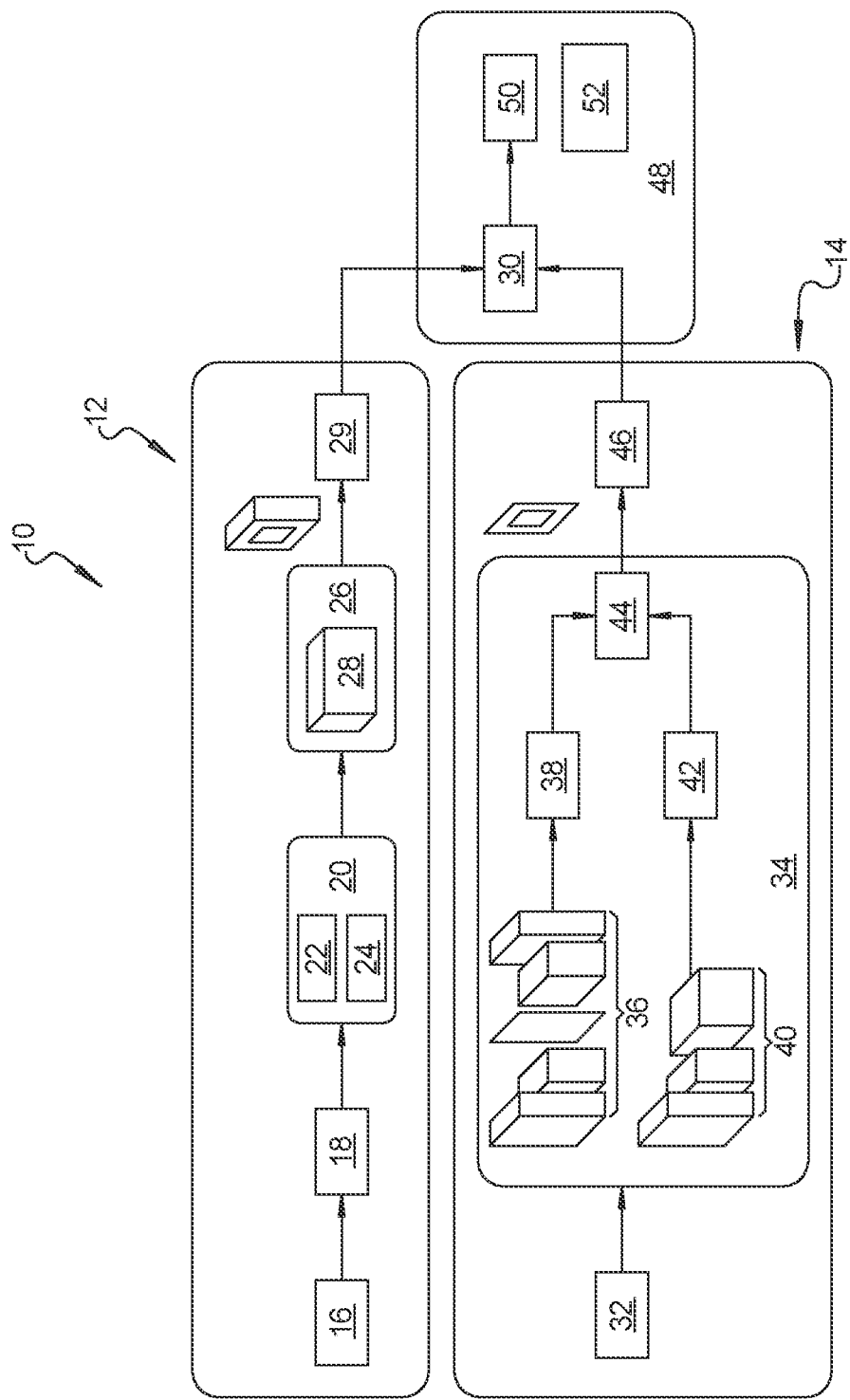
FIG. 1 is a flow diagram of an autonomous driving 3D object detection method and system according to an exemplary aspect.

Referring to FIG. 1, an autonomous driving 3D object detection method 10 provides 3D object detection in a 3D object detection segment 12 and independently provides 2D object detection in a 2D object detection segment 14. A pseudo-code algorithm is applied as described in Algorithm 1. The 3D object detection segment 12 receives data from one or more Laser Imaging Detecting And Ranging (LIDAR) sensors 16 to generate 3D (3 dimensional) point clouds to capture 3D structures in a set of vehicle visible scenes. An output of the LIDAR sensors 16 is uploaded to multiple point clouds 18. From the point clouds 18, point cloud data is transferred to a Region Proposal Network (RPN) 20, wherein the data is acted on in a 3D point cloud segmentation member 22, which performs a task where each point in the point clouds is assigned a label representing a real-world entity, and is acted on by a 3D proposal generator 24.

Output from the RPN 20 is transferred to a Region-based Convolutional Neural Network (RCNN) 26 wherein a 3D box estimator 28 is applied to generate one or more bounding-boxes (BB)s. The RCNN 26, first using a selective search, identifies a manageable number of bounding-box or BB object region candidates in a region of interest (ROI). The RCNN 26 then extracts Convolutional Neural Network (CNN) features from independent regions of the searched scene for classification. An output from the RCNN 26 is passed through a 3D detector 29 of the 3D object detection segment 12 whose output is passed for fusion with an output from an enhanced 2D detector 46 from the 2D object detection segment 14 discussed below to a box consistency and filtering unit 30.

In parallel with 3D object detection, 2D object detection is performed and is summarized as follows. 2D detection is enhanced by combining one-stage 2D object detection and two-stage instance segmentation. A 2D object detection network treats object detection as a regression problem, taking a given input image and simultaneously learning the BBs coordinates and corresponding class label probabilities. An instance segmentation network then automatically segments and constructs pixel-wise masks for every object in an image. The same two-stage procedure is also adopted, with the first stage being an RPN to generate regions of an image that potentially contain an object (RPN). Each of the regions is ranked based on its score which determines how likely it is that a given region could potentially contain an object, and then a top "N" most confident scored regions are kept for the second stage.

In parallel with operation of the 3D object detection segment 12, the 2D object detection segment 14 is provided with a camera 32 whose image output is passed to an instance segmentation deep neural network (DNN) 34 having an instance segmentation device 36 wherein each instance of a given object receives a different label. Output from the instance segmentation device 36 is passed to an instance mask detector 38 producing as an output is a binary mask for each region instead a bounding box. In parallel with operation of the instance segmentation device 36 within the DNN 34 a 2D object detector DNN 40 passes 2D data of the images of the camera 32 to a 2D object enhancer 42. Output from the 2D object enhancer 42 is transferred together with output from the instance mask detector 38 into a constraint device 44. As a consistency constraint the 2D BBs as output from of the deep learning-based object detection from the 2D object enhancer 42 that also have a high overlap with the corresponding instance mask as the output from the DNN 34 provide combined 2D object proposals with a higher confidence. Output from the constraint device 44 and the DNN 34 is passed to an enhanced 2D detector 46.

In addition to the output from the 3D box estimator 28 an output from the enhanced 2D detector 46 is also passed to the box consistency and filtering unit 30 of a 2D and 3D synergy segment 48. The box consistency and filtering unit 30 filters predicted 3D BBs based on high overlap with the corresponding high confidence 2D proposals after projection onto the images. This functions to filter, i.e., reduce false positive objects, which have been incorrectly detected in the point clouds 18 and includes detected objects in the image that were not detected from the point clouds 18 to reduce false negatives. A final result produced by the 3D synergy segment 48 is a final 3D object detection 50 for an aggregated perception 52.

From the above the autonomous driving 3D object detection method 10 may therefore be divided into 3 steps: Step 1) 3D object detection in the 3D object detection segment 12; Step 2) Enhanced 2D object detection in the 2D object detection segment 14; and Step 3) Synergy of 2D and 3D detections in the 2D and 3D synergy segment 48. The 3D object detection is performed directly from the point clouds 18 and the 2D object detection takes advantage of 2D object detectors and instance segmentation to enhance 2D detection. Finally a fusion of image data and LIDAR sensor data is performed, and objects that are consistent in both the 3D and the 2D detectors are retained to improve performance and make the results more reliable across different datasets.

A pseudo-code for the architecture is presented below as Algorithm 1.

Algorithm 1:
 Algorithm1 object detection3D (image, lidar, calibration_file)
  Input: image, lidar, calibration_file
  Output: (3D_detection, class_type, scores, 2D_detection) for each object
  3D_detection contains: 3D_location (x, y, z), 3D_bbs_sizes (h, w, I), and object orientation (θ). (x, y, z, h, w, I, θ)
  Load trained models
  model_3D←load trained 3D object detection model
  model_2D←load trained 2D object detection model
  model_mask←load trained instance segmentation model
  lidar←pre_process_lidar(lidar, calibration_file)
  image←pre_process_image(image, calibration_file)
  Step 1 3D object detection
  rpn_output_3D←rpn_3D (model_3D, lidar)//RPN, stage1
  rpn_filtered←filter_rpn (rpn_output_3D)
  rcnn_output_3D←rcnn_network_3D(rpn_filtered, model_3D, lidar)//RCNN, stage2
  pred_boxes_3D,class_type_3D, scores_3D←rcnn_output_3D
  pred_boxes3d_final←filter_by_scores_3D (pred_boxes_3D, scores_3D, scores_threshold_3D)
  Step 2 Enhanced 2D object detection
  //Performs one-stage 2D object detection, in parallel
  pred_boxes_2D,class_type_2D, scores_2D←network_2D (model_3D, image)
  pred_boxes_2D_final←filter_by_scores(pred_boxes_2D, scores_2D, scores_threshold_2D, IoU_t)//Algorithm 2
  //Performs instance segmentation, in parallel
  mask, pred_boxes_mask,class_type_mask, scores_mask←
  mask_network (model_mask, image)
  pred_mask_final←filter_by_scores(pred_boxes_mask, scores_mask, scores_threshold_mask, IoU_t)//Algorithm 2
  //Enhanced 2D object detection
  combined_2D_detection←combine_2D_detection(pred_boxes_2D_final, pred_mask_final, IoU_t) //Algorithm 3
  Step 3 Synergy of 2D and 3D detection
  B2D={b2D1, . . . b2Dm}, B2D is the list of 2D detection combined=combined_2D_detection
  B3D={b3D1, . . . b3Dm}, B3D is the list of 3D detection boxes=pred_boxes3d_final
  Filtered_3D_detection←{ }
  For b3Di in B3D:
   b3D_projectedi=project_3dto2D(b3Di, calibration_file)
   IoU_result={ }
   For bj in B2D:
    IoU_result←IoU_result U IoU(bj, b3D_projectedi)
   IoU_max←argmax IoU_result
   If IoU_result [IoU_max]>IoU_t:
    Filtered_3D_detection←Filtered_3D_detection U b3Di
   end
  end
 end
 return Filtered_3D_detection, class_type_3D, scores_3D, combined_2D_detection The final outputs of the presently disclosed architecture are 3D_detection, class_type, scores, and 2D_detection for each object including. •3D_detection: 3D_bbs_sizes (3D object dimensions: height, width, length (in meters)), 3D_location (3D object location x,y,z in camera coordinates (in meters)) and θ is the object orientation• class_type: class type of the object• scores: confidence of the detection• 2D_detection: 2D BB of object in the image (0-based index): contains left, top, right, bottom pixel coordinates.

In step 2, each of the N selected regions go through three parallel branches of the instance segmentation network: label prediction, BB prediction, and mask prediction. In that step the classes and box offset are predicted in parallel, and a binary mask is computed for each region, automatically segmenting and constructing pixel-wise masks for every object in an image. Redundant proposals are removed, using a confidence score and non-maximum suppression (NMS) based IoU_t (see Algorithm 2 below).

Figure 2:
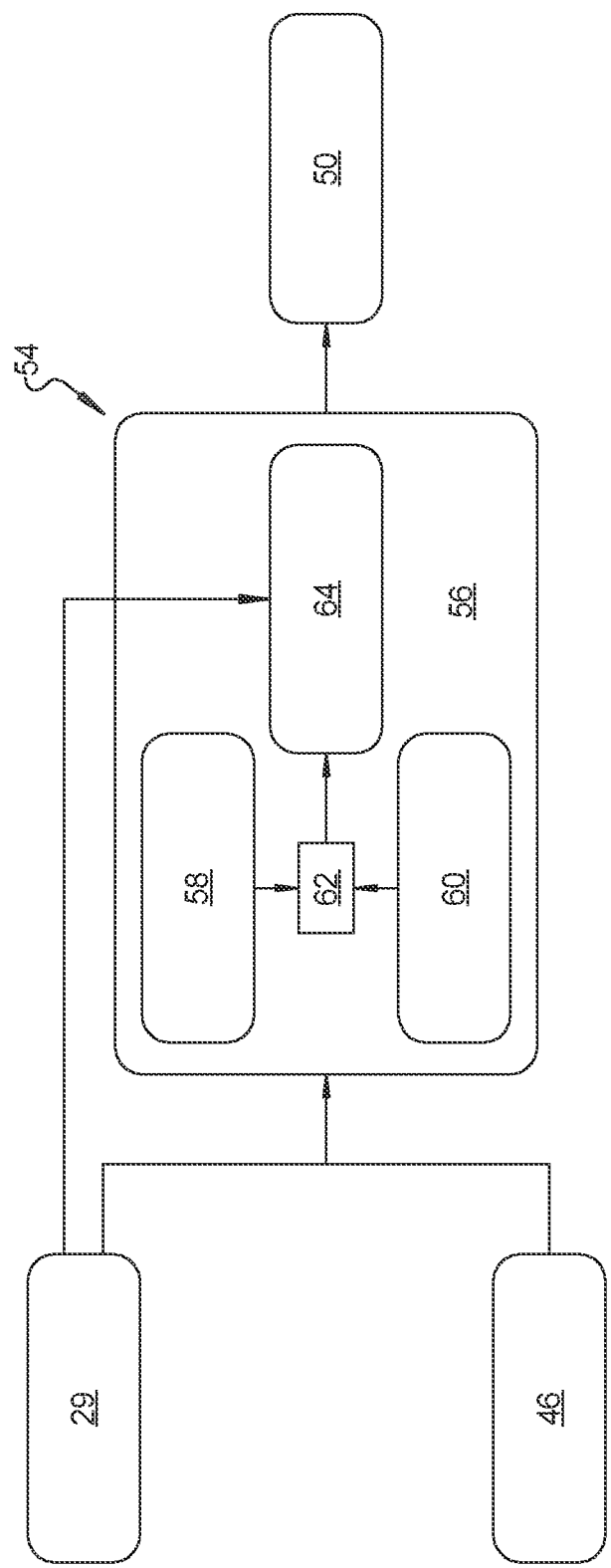
FIG. 2 is a flow diagram of a 2D and 3D synergy portion of the method of FIG. 1.

Referring to FIG. 2 and again to FIG. 1, signals from the 3D detector 29 and the enhanced 2D detector 46 described in reference to FIG. 1 are passed through the box consistency and filtering unit 30. Within the box consistency and filtering unit 30, a 2D projection of 3D BBs 58 and an enhanced 2D BB with pixels mask 60 are passed through a first filter 62 and to a final 3D BB filter 64 to generate the final 3D object detection 50. During enhanced 2D detection a BB consistency constraint is considered, wherein the 2D BBs as the output of the deep learning-based 2D object detector that have a high overlap (IoU>IoU_t) with its corresponding instance mask defining the output of the instance segmentation network, are chosen. As a result, the combined 2D object proposals are obtained with higher confidence also using Algorithm 3.

A confidence of the 2D detector is thereby increased, keeping only the detected objects that are consistent in both detectors for 2D object detector synergy. The enhanced 2D BBs are used in a final step to filter the predicted 3D BBs based on a high overlap (IoU>IoU_t) with its corresponding enhanced 2D proposal after projecting onto the image.

A pseudo-code to filter 2D BBs from 2D detection based on scores and non-maximum suppression is presented in Algorithm 2 below.

Algorithm 2:
  Algorithm 2_filter_by_scores(BBs, Scores, S_t, IoU_t):
  Input: BBs={bb1, ... bbm}, Scores={s1, ... sm}
    BBs is the list of detection boxes
    Scores contains the detection scores
    IoU_t is th IoU_threshold
    S_t is the score threshold
  Final_BBs←{ }
    While BBs is not empty:
    s_max←argmax Scores
    If Scores[s_max]<S_t:
      BBs←BBs—BBs[s_max]
      Scores←Scores—Scores[s_max]
      continue
    end
    B_max←BBs[s_max]
    Final_BBS←Final_BBs U B_max; BBs←BBs-B_max
    For bi in BBs:
      If IoU(B_max, bi)>IoU_t and same_class_type:
        BBs←BBs-bi; Scores←Scores-bi
      end
    end
  end
  return Final_BBs A pseudo-code to combine 2D BBs from instance segmentation and 2D object detection is presented in Algorithm 3 below.

Algorithm 3:
  Algorithm3combine_2D_detectionpred_boxes2d_final, pred_mask_final, IoU_t
  Input: B2D={b2D1, ... b2Dm}, Bmask={bmask1, ... bmaskm}
    B2D is the list of 2D detection boxes
    Bmask is the list of mask detection boxes
    IoU_t is IoU_threshold
    Combined_BBs+{ }
    For bi in B2D:
      IoU_result={ }
      For bj in Bmask:
        IoU_result←IoU_result U IoU(bj, bi)
      IoU_max←argmax IoU_result
      If IoU_result [IoU_max]>IoU_t:

For 3D object detection from the point cloud 18, the unordered point clouds in 3D are directly operated on, which differs from other methods that use a projected point cloud to a battery electric vehicle (BEV) or operate on quantized 3D tensor data (voxels). The 3D detection network may be trained for example using a vision benchmark, which may provide up to 15 cars and 30 pedestrians visible per image. The RCNN network of the present disclosure includes two subnetworks, the region proposal network RPN 20 and the region CNN or RCNN 26, that may be trained separately. The RPN 20 is first trained and after the RCNN 26 is trained online, ground truth box augmentation is used, which copies object boxes and inside points from one 3D point-cloud scene to the same locations in another 3D point-cloud scene. For each 3D point-cloud scene in a training set, the points from each 3D point-cloud scene are subsampled as the inputs, so the inputs are always of the same size n_points. For 3D point-cloud scenes with a number of points fewer than n_points, the points to obtain exactly n_points are randomly repeated. The redundant proposals are also removed using NMS based on an oriented IoU from the BEV to generate a small number of high-quality proposals.

For example, oriented NMS with IoU_threshold IoU_tx are used, and only the top proposals are kept for the refinement of stage-2 sub-network. A 3D BB is represented as (x, y, z, h, w, l, θ) in a LIDAR coordinate system, where (x, y, z) is the object center location, (h, w, l) is the object size, and θ is the object orientation from the BEV.

With the final 3D detections the predicted 3D BBs are filtered based on a high overlap defined as IoU>IoU_t, with a corresponding enhanced 2D proposal after projecting onto the image. Objects incorrectly detected in point clouds 18 are thereby filtered, which reduces false positives, and detected objects in the image are included that were not detected from the point clouds 18 to reduce false negatives. The final result includes synergy of 2D BBs and 3D BBs from heterogeneous sensors.

An autonomous driving 3D object detection method 10 of the present disclosure offers several advantages. These include a hybrid, aggregated perception approach that instead of solely relying on 3D proposals, leverages both 2D object detectors and enhanced 3D object detection. Applying learning directly received in raw point clouds, a precise estimate of 3D BBs is provided even under strong occlusion or with very sparse points and further applying 2D object detection. Noise is filtered together with incorrect detections made from point clouds, as point clouds do not consider any visual information that is also relevant for detection. For 3D object detection from a point cloud, direct operation on the unordered point clouds in 3D is applied in contrast to known methods that use a projected point cloud to a BEV or operate on quantized 3D tensor data (voxels). 2D detection is enhanced by combining one-stage 2D object detection (treating object detection as a regression problem) and two-stage instance segmentation. The first stage is a region proposal network (RPN) and in the second stage in parallel the classes and box offset are predicted and a binary mask is calculated for each region, automatically segmenting and constructing pixel-wise masks for every object in an image. In addition, the objects that are consistent in both detectors are retained. A final result improves the current perception pipeline with the synergy of 2D BBs and 3D BBs from heterogeneous sensors.

The present disclosure provides a combined approach to yield improvements in 3D object detection results.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for performing object detection during autonomous driving, comprising:
  performing a 3D object detection in a 3D object detection segment;
  uploading an output of multiple sensors in communication with the 3D object detection segment to multiple point clouds;
  transferring point cloud data from the multiple point clouds to a Region Proposal Network (RPN);
  independently performing 2D object detection in a 2D object detection segment in parallel with the 3D object detection in the 3D object detection segment;
  taking a given input image and simultaneously learning box coordinates and class label probabilities in a 2D object detection network operating to treat object detection as a regression problem;

passing image output from a camera to an instance segmentation deep neural network (DNN) having an instance segmentation device wherein different instances of the object receive a different label; and moving an instance product from the instance segmentation device to an instance mask detector wherein a segmentation device output is a binary mask for the regions.

2. The method of claim 1, further including operating multiple Laser Imaging Detecting And Ranging (LIDAR) sensors to generate the output of multiple sensors in the 3D object detection segment to further generate 3D point clouds to capture 3D structures in a set of vehicle visible scenes.

3. The method of claim 2, further including operating the RPN to assign data from the multiple point clouds in a 3D point cloud segmentation member to individual points in the point clouds and assigning a label representing a real-world entity.

4. The method of claim 3, further including transferring a product from the RPN to a Region-based Convolutional Neural Network (RCNN).

5. The method of claim 4, further including:
applying a 3D box estimator to generate one or more bounding boxes (BB)s; and
passing a work product from the 3D box estimator for fusion with 2D object output from the 2D object detector to a box consistency and filtering unit.

6. The method of claim 1, further including enhancing 2D detection by combining one-stage 2D object detection and two-stage instance segmentation.

7. The method of claim 6, further including automatically segmenting and constructing pixel-wise masks for every object in an image in an instance segmentation network.

8. The method of claim 7, further including:
generating regions of the image that potentially contain an object;
ranking the regions based on a score producing scored regions which determines how likely it is that any one of the regions could potentially contain the object; and
retaining a top "N" most confident ones of the scored regions.

9. The method of claim 1, further including:
transferring 2D data from a 2D object detection segment defining data of the images of the camera to a 2D object detector;
transferring an output from the 2D object detector together with an output from the instance mask detector into a constraint device; and
sending an output from the constraint device and the DNN to an enhanced 2D detector.

10. A method for performing object detection during autonomous driving, comprising:
receiving sensor data from multiple sensors and applying the sensor data to generate point clouds to capture 3D structures;
performing a 3D object detection in a 3D object detector including identifying multiple 3D objects directly from the point clouds;
conducting enhanced 2D object detection in parallel with the 3D object detection to identify 2D objects using an enhanced 2D object detector;
performing a synergy of the 2D objects and the 3D objects in a 2D and 3D synergy segment;
producing a final 3D object detection for an aggregated perception;

entering data from the 3D objects into a 3D box estimator;
passing an output from the 3D box estimator and an output from the enhanced 2D detector to a box consistency and filtering unit to generate multiple bounding-boxes (BB)s;
filtering the multiple bounding-boxes (BB)s based on high overlap with high confidence 2D proposals after projection onto multiple images functioning as a filter reducing false positive objects incorrectly detected in the point clouds;
generating regions of the multiple images;
ranking the regions based on a score which determines how likely it is that any one of the regions could potentially contain one of the multiple 3D objects;
retaining a top "N" most confident scored regions;
sending individual ones of the N most confident scored regions through three parallel branches of an instance segmentation network defining a label prediction, a BB prediction, and a mask prediction; and
computing a binary mask for each of the N most confident scored regions, automatically segmenting and constructing pixel-wise masks for every object in the image;
and removing redundant proposals using a confidence score and a non-maximum suppression (NMS) based IoU_t.

11. The method of claim 10, further including enhancing the 2D object detection by applying instance segmentation together with the 2D object detectors.

12. The method of claim 10, further including:
fusing image data and sensor data; and
retaining individual ones of the 2D objects and the 3D objects that are consistent in both the 3D object detection segment and the 2D object detection segment.

13. A system to perform object detection during autonomous driving, comprising:
a 3D object detection segment performing 3D object detection;
multiple sensors in communication with the 3D object detection segment, the multiple sensors individually having an output uploaded to one of multiple point clouds;
point cloud data from the multiple point clouds transferred to a Region Proposal Network (RPN);
a 2D object detector independently performing 2D object detection in parallel with the 3D object detection in the 3D object detection segment;
a 2D object detection network operating to treat object detection as a regression problem taking a given input image and simultaneously taking learning box coordinates and class label probabilities;
a camera outputting an image;
an instance segmentation deep neural network (DNN) having an instance segmentation device wherein different instances of the object receive a different label; and
an instance mask detector receiving an output from the instance segmentation device where the output of the instance segmentation device defines a binary mask for regions of the vehicle visible scenes.

14. The system of claim 13, wherein the multiple sensors individually define a Laser Imaging Detecting And Ranging (LIDAR) sensor operating to capture 3D structures in a set of vehicle visible scenes.

* * * * *